United States Patent
Hetzer et al.

(10) Patent No.: US 7,938,673 B2
(45) Date of Patent: May 10, 2011

(54) TERMINAL STRIP

(75) Inventors: Ulrich Hetzer, Berlin (DE); Frank Mossner, Berlin (DE)

(73) Assignee: ADC GmbH, Berlin (DE)

( * ) Notice: Subject to any disclaimer, the term of this patent is extended or adjusted under 35 U.S.C. 154(b) by 0 days.

(21) Appl. No.: 12/522,953

(22) PCT Filed: Dec. 13, 2007

(86) PCT No.: PCT/EP2007/010931
§ 371 (c)(1),
(2), (4) Date: Jul. 13, 2009

(87) PCT Pub. No.: WO2008/086863
PCT Pub. Date: Jul. 24, 2008

(65) Prior Publication Data
US 2010/0075530 A1    Mar. 25, 2010

(30) Foreign Application Priority Data
Jan. 18, 2007  (DE) .................. 10 2007 002 769

(51) Int. Cl.
*H01R 4/24* (2006.01)
(52) U.S. Cl. ...................................... 439/404
(58) Field of Classification Search .................. 439/404, 439/405, 395, 391, 389, 387
See application file for complete search history.

(56) References Cited

U.S. PATENT DOCUMENTS

| | | |
|---|---|---|
| 5,228,872 A | 7/1993 | Liu |
| 5,951,330 A | 9/1999 | Reichard, Jr. et al. |
| 5,975,936 A | 11/1999 | Lin et al. |
| 5,989,071 A | 11/1999 | Larson et al. |
| 6,010,353 A * | 1/2000 | Ensz et al. ................. 439/404 |
| 6,050,842 A | 4/2000 | Ferrill et al. |
| 6,126,476 A | 10/2000 | Viklund et al. |
| 6,213,809 B1 | 4/2001 | Viklund |
| 6,238,231 B1 * | 5/2001 | Chapman et al. ........... 439/404 |
| 6,305,950 B1 | 10/2001 | Doorhy |
| 6,358,093 B1 | 3/2002 | Phommachanh et al. |
| 6,371,793 B1 * | 4/2002 | Doorhy et al. ............. 439/404 |
| 6,371,794 B1 * | 4/2002 | Bauer et al. ............... 439/404 |
| 6,648,670 B1 | 11/2003 | Chen |
| 6,796,847 B2 * | 9/2004 | AbuGhazaleh et al. ...... 439/676 |
| 6,953,362 B2 | 10/2005 | Mossner et al. |
| 7,591,654 B2 * | 9/2009 | Neumetzler .................. 439/79 |
| 7,798,866 B2 | 9/2010 | Hetzer et al. |
| 2005/0136747 A1 | 6/2005 | Caveney et al. |

(Continued)

FOREIGN PATENT DOCUMENTS

DE    43 14 908    11/1993

(Continued)

*Primary Examiner* — Michael C Zarroli
(74) *Attorney, Agent, or Firm* — Merchant & Gould P.C.

(57) ABSTRACT

The invention relates to a terminal strip (1) comprising a housing (2) and at least four insulation displacement contacts (K1-K8), the at least four insulation displacement contacts (K1-K8) being arranged in a series (3, 4). The housing (2) comprises housing walls (5) between which the insulation displacement contacts (K1-K8) are arranged. The insulation displacement contacts (K1-K8) are at a 45° angle in relation to the housing walls (5), and two separate insulation displacement contacts form a contact pair. The insulation displacement contacts (K1-K8) of a contact pair (K1, K2; K7, K8; K3, K6; K4, K5) are parallel in relation to each other, whereas adjacent insulation displacement contacts (K1-K8; K5, K6) of different contact pairs are mutually rotated by 90° about the longitudinal axis (L) of the insulation displacement contacts (K1-K8).

7 Claims, 2 Drawing Sheets

U.S. PATENT DOCUMENTS

| | | |
|---|---|---|
| 2005/0202697 A1 | 9/2005 | Caveney et al. |
| 2007/0111555 A1 | 5/2007 | Neumetzler |
| 2009/0225979 A1 | 9/2009 | Pelletier et al. |
| 2010/0003847 A1 | 1/2010 | Hetzer et al. |
| 2010/0041250 A1 | 2/2010 | Hetzer et al. |

FOREIGN PATENT DOCUMENTS

| | | |
|---|---|---|
| DE | 102 57 308 | 7/2004 |
| DE | 20 2005 001 178 | 1/2005 |
| DE | 103 33 913 | 2/2005 |
| EP | 0 899 823 | 3/1999 |
| EP | 0 899 827 | 3/1999 |
| EP | 0 899 828 | 3/1999 |
| EP | 0 923 171 | 6/1999 |
| EP | 0 969 569 | 1/2000 |
| EP | 0 982 815 | 3/2000 |
| EP | 1 312 137 | 5/2005 |
| EP | 1 622 234 | 2/2006 |
| TW | M269631 | 7/2005 |
| WO | WO 01/80376 | 10/2001 |
| WO | WO 01/82418 | 11/2001 |
| WO | WO 02/15340 | 2/2002 |
| WO | WO 2005/064755 | 7/2005 |
| WO | WO 2005/101579 | 10/2005 |

* cited by examiner

TERMINAL STRIP

BACKGROUND

This application is a National Stage Application of PCT/EP2007/010931, filed 13 Dec. 2007, which claims benefit of Ser. No. 10 2007 002 769.0, filed 18 Jan. 2007 in Germany and which applications are incorporated herein by reference. To the extent appropriate, a claim of priority is made to each of the above disclosed applications.

Such a terminal block of the generic type is known, for example, from DE 102 57 308 B3. The terminal block is in this case in the form of a plug-in connector for printed circuit boards, comprising a number of contact elements, the contact elements each having two connection sides, one connection side being in the form of an insulation displacement contact for connecting wires and the other connection side being in the form of a fork contact for making contact with connection pads on a printed circuit board, and a plastic housing, into which the insulation displacement contacts of the contact elements can be plugged, the insulation displacement contact and the fork contact being arranged such that they are turned towards one another, and at least one lower edge of the insulation displacement contact being supported on the plastic housing such that the contact elements are held in the plastic housing such that they cannot fall out when connection forces are occurring on the insulation displacement contacts. The insulation displacement contacts are in this case positioned between housing walls, the insulation displacement contacts being aligned at an angle of 45° with respect to the housing walls, the insulation displacement contacts in the row all being aligned parallel to one another.

SUMMARY

The invention is based on the technical problem of providing a terminal block which is improved in terms of crosstalk.

In this regard, the terminal block comprises a housing and at least four insulation displacement contacts, the at least four insulation displacement contacts being arranged in a row, the housing being formed with housing walls between which the insulation displacement contacts are arranged, the insulation displacement contacts being aligned at an angle of 45° with respect to the housing walls, and in each case two insulation displacement contacts forming a contact pair, the insulation displacement contacts of one contact pair being aligned parallel to one another, whereas adjacent insulation displacement contacts of different contact pairs are arranged with respect to one another such that they are rotated through 90° about the longitudinal axis of the insulation displacement contacts. As a result, the capacitive coupling between contacts of adjacent contact pairs is reduced, which results in a reduction in the crosstalk. The two adjacent contacts clearly form a plate capacitor, the gap owing to the opposing angled position continually increasing in size, which reduces the capacitance. Note will be made here of the fact that the angle of 45° may fluctuate by ±5° owing to the tolerances of the housing.

In a preferred embodiment, the housing walls between insulation displacement contacts of one contact pair have a smaller width than the housing walls between insulation displacement contacts of different contact pairs. This also reduces the capacitive coupling.

In a further preferred embodiment, the terminal block comprises at least one further row of insulation displacement contacts, which is arranged parallel to the first row of insulation displacement contacts, opposite insulation displacement contacts of different rows being arranged with respect to one another such that they are rotated through 90° about the longitudinal axis of the insulation displacement contacts. This also reduces the crosstalk.

In a further preferred embodiment, the gap between the rows is larger than the largest gap between two adjacent insulation displacement contacts in a row. In this case, the gap is preferably selected such that the insulation displacement contacts can be connected using standard connection tools.

In a further preferred embodiment, the insulation displacement contacts are connected to a printed circuit board, further preferably the longitudinal axes of the insulation displacement contacts being aligned parallel to the surface of the printed circuit board.

In a further preferred embodiment, the insulation displacement contacts are connected to the printed circuit board via SMD-like contacts.

In a further preferred embodiment, at least one contact pair is crossed over prior to being connected to the printed circuit board.

BRIEF DESCRIPTION OF THE DRAWINGS

The invention will be explained in more detail below with reference to a preferred exemplary embodiment. In the figures.

DETAILED DESCRIPTION

Figure 1:
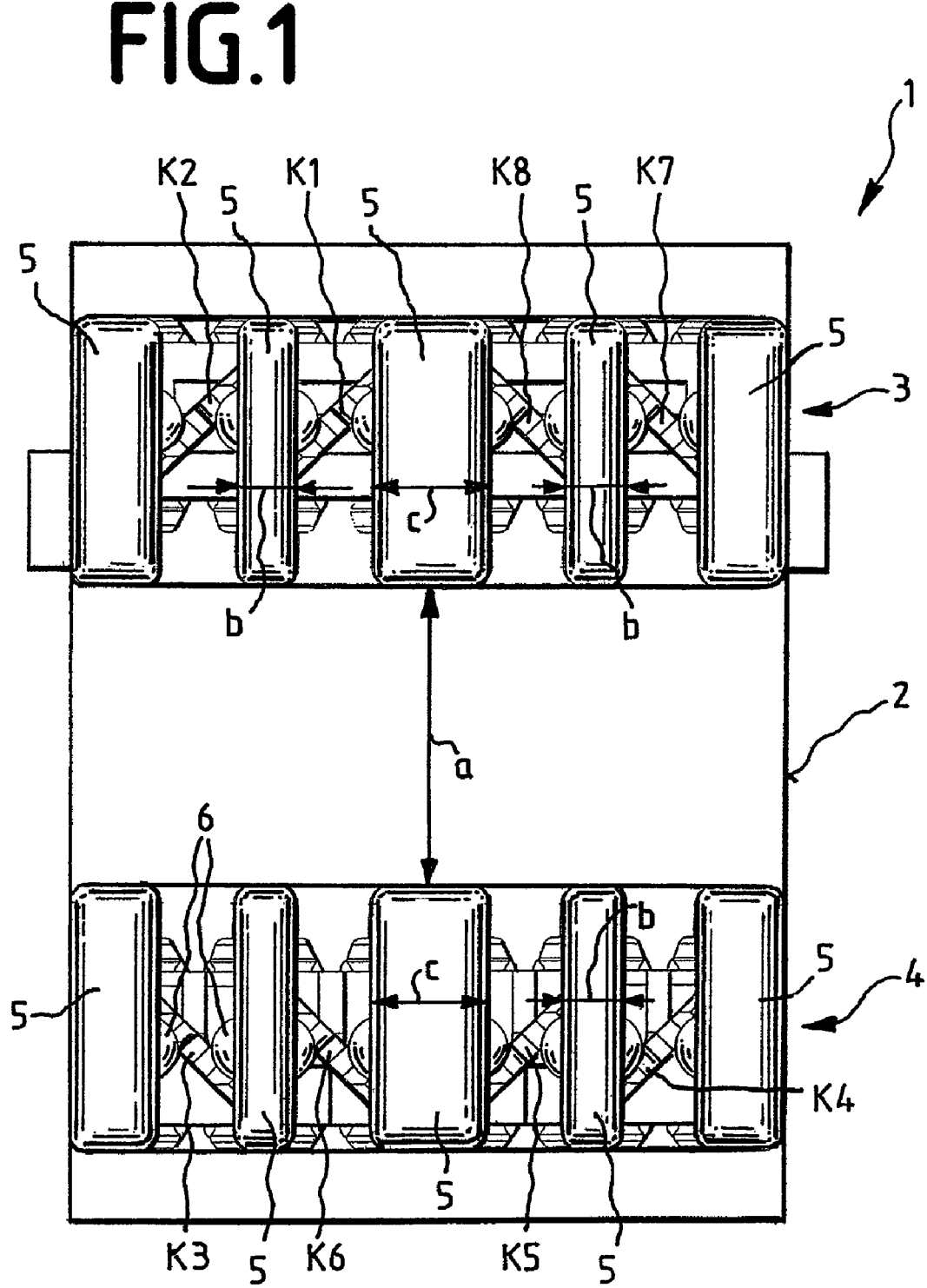
FIG. 1 shows a plan view of a terminal block having two rows.

The terminal block 1 comprises a housing 2 having two rows 3, 4 of insulation displacement contacts K1-K8. In this case, the row 3 comprises the insulation displacement contacts K1, K2, K7 and K8, in each case the insulation displacement contacts K1, K2 and K7, K8 forming a contact pair. Correspondingly, the row 4 is formed by the insulation displacement contacts K3-K6, the insulation displacement contacts K3, K6 and K4, K5 forming a contact pair. The two rows 3, 4 are designed to be parallel to one another. Furthermore, the rows 3, 4 comprise different housing walls 5 between which the insulation displacement contacts K1-K8 are arranged, the insulation displacement contacts K1-K8 being set at an angle of 45° with respect to the housing walls 5. In this case, the insulation displacement contacts K1, K2 are aligned parallel to one another. The same applies for the insulation displacement contacts K7, K8; K3, K6 and K4, K5, which each form a contact pair. Adjacent insulation displacement contacts, which are arranged in a common row 3, 4 but belong to different contact pairs, i.e. the insulation displacement contacts K1, K8 in row 3 or the insulation displacement contacts K5, K6 in row 4, for example, are arranged with respect to one another such that they are rotated through 90° about the longitudinal axis of the insulation displacement contacts. In this case, the longitudinal axis is an axis which would pass through the plane of the paper at right angles. In this case, the gap b between the insulation displacement contacts of one contact pair is smaller than the gap c between adjacent insulation displacement contacts of different contact pairs, the width of the housing walls 5 being defined as the gap. The gap a between the rows 3 and 4 is in this case larger than the gap c.

It can further be seen that opposite insulation displacement contacts from different rows, for example the insulation displacement contacts K2 and K3, are likewise arranged with respect to one another such that they are rotated through 90° about the longitudinal axis of the insulation displacement contacts.

Furthermore, pimples 6 are arranged on the inner sides of the housing walls 5 and are used for firmly holding the wires which have been pressed into the insulation displacement contacts.

Figure 2:
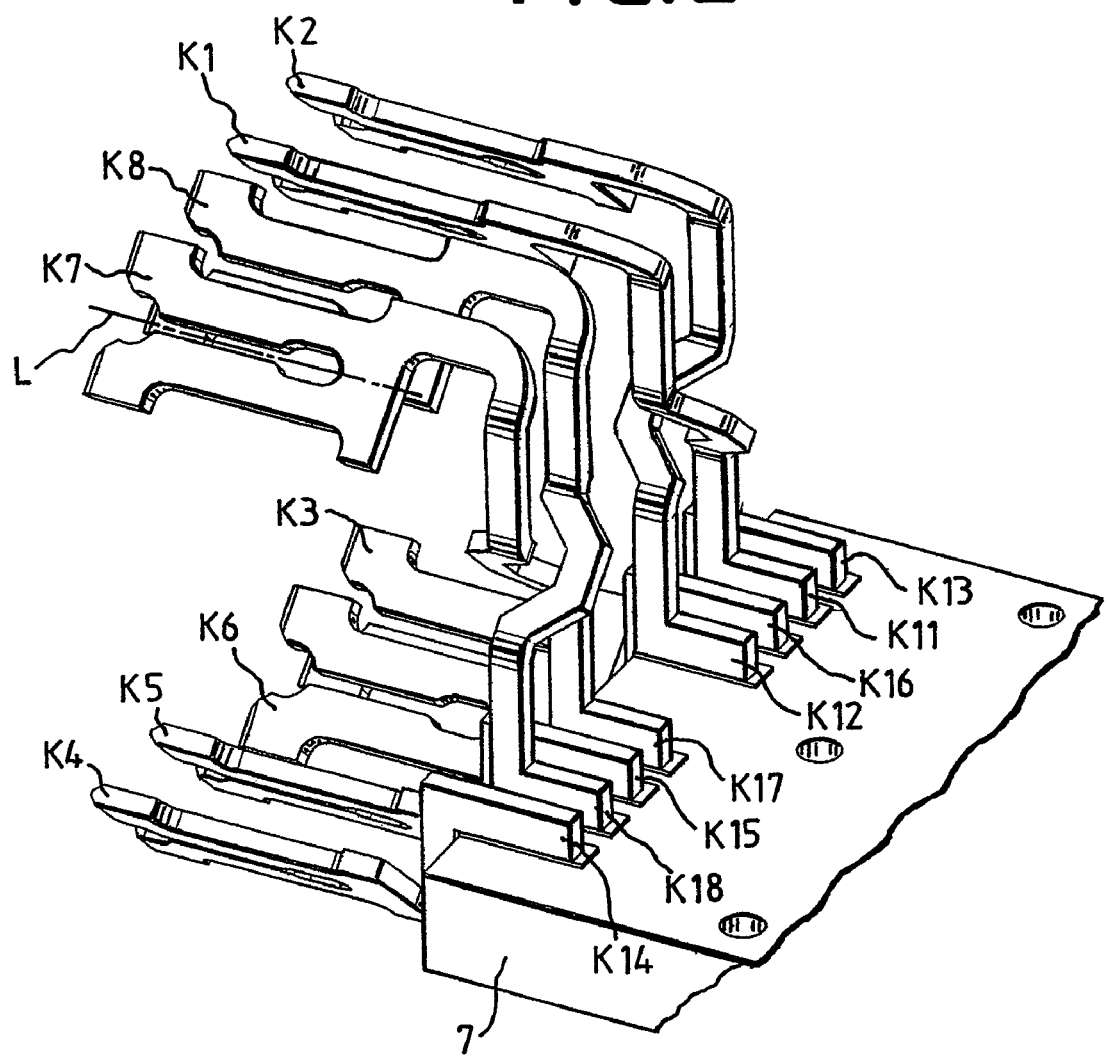
FIG. 2 shows a perspective illustration of the insulation displacement contacts without a housing, connected to a printed circuit board.

FIG. 2 now illustrates a preferred embodiment for connecting the insulation displacement contacts K1-K8 to a printed circuit board 7. For this purpose, the insulation displacement contacts K1-K8 are formed, at their opposite ends, with SMD-like contacts K11-K18, which are preferably soldered on the surface of the printed circuit board 7. It can further be seen that the insulation displacement contacts K1 and K2 and K7 and K8 are crossed over on their way to the printed circuit board 7 in order thus to compensate for the increased crosstalk which is produced between the insulation displacement contacts and the SMD-like contacts owing to the longer connection pieces.

LIST OF REFERENCE SYMBOLS

1 Terminal block
2 Housing
3, 4 Rows
5 Housing walls
6 Pimples
7 Printed circuit board
K1-K8 Insulation displacement contacts
K11-K18 SMD-like contacts

The invention claimed is:

1. A terminal block, comprising:
a housing including housing walls; and
a plurality of insulation displacement contacts, the insulation displacement contacts being arranged in a first row and a second row that extends parallel to the first row, each of the insulation displacement contacts being arranged between two of the housing walls, the insulation displacement contacts being aligned at an angle of 45° with respect to the housing walls,
wherein the insulation displacement contacts form contact pairs, wherein the insulation displacement contacts of each contact pair are aligned parallel to one another, whereas the insulation displacement contacts of adjacent contact pairs in each row are arranged with respect to one another such that they are rotated through 90° about a longitudinal axis of each of the insulation displacement contacts, and
wherein the housing wall extending between the insulation displacement contacts of a contact pair has a constant width that is narrower than a constant width of the housing wall extending between the insulation displacement contacts of adjacent contact pairs.

2. The terminal block as claimed in claim 1, wherein opposite insulation displacement contacts of different rows are arranged with respect to one another such that they are rotated through 90° about the longitudinal axes of the insulation displacement contacts.

3. The terminal block as claimed in claim 2, wherein a gap between the rows is larger than the constant width of the housing wall extending between the insulation displacement contacts of adjacent contact pairs.

4. The terminal block as claimed in claim 1, wherein the insulation displacement contacts are connected to a printed circuit board.

5. The terminal block as claimed in claim 4, wherein the longitudinal axes of the insulation displacement contacts are aligned parallel to a surface of the printed circuit board.

6. The terminal block as claimed in claim 4, wherein the insulation displacement contacts are connected to the printed circuit board via SMD-like contacts.

7. The terminal block as claimed in claim 4, wherein the insulation displacement contacts of at least one of the contact pairs are crossed over prior to being connected to the printed circuit board.

\* \* \* \* \*